United States Patent [19]

Muntean et al.

[11] 4,149,506

[45] Apr. 17, 1979

[54] FUEL INJECTOR

[75] Inventors: George L. Muntean; Harry L. Wilson; Julius P. Perr, all of Columbus, Ind.

[73] Assignee: Cummins Engine Company, Inc., Columbus, Ind.

[21] Appl. No.: 626,722

[22] Filed: Oct. 29, 1975

[51] Int. Cl.$^2$ .......................... F02M 39/00; F02B 3/00
[52] U.S. Cl. ...................... 123/139 AK; 123/139 DP; 123/32 JV; 239/533.7; 239/533.9
[58] Field of Search ...... 123/32 JV, 139 AJ, 139 DP, 123/139 AK, 139 R, 32 R; 239/533.7, 533.8, 533.9

[56] References Cited

U.S. PATENT DOCUMENTS

| | | | |
|---|---|---|---|
| 2,015,887 | 10/1935 | Eek | 123/32 JV |
| 2,512,644 | 6/1950 | Hauber | 123/139 AS |

Primary Examiner—Ronald B. Cox
Attorney, Agent, or Firm—Merriam, Marshall & Bicknell

[57] ABSTRACT

This disclosure deals with a fuel injector for an internal combustion engine. The injector includes an injector body having a fuel metering chamber formed therein which receives fuel from a fuel supply. A plunger is movable into the chamber in an injection stroke to force fuel from the chamber and out of the injector through spray holes. A valve member is mounted in the path of fuel flow from the chamber to the spray holes, the valve member being movable between first and second positions. In the first position, the valve member seals the path and prevents air in the combustion chamber from mixing with the fuel being metered into the metering chamber, and in the second position the valve member closes the spray holes to terminate injection. During an injection stroke, the plunger moves the valve member from the first position toward the second position, and fuel injection takes place while the valve member is intermediate the first and second positions. The valve member is also subjected to hydraulic forces at the end of the injection stroke, which move the valve member into the second position in order to abruptly terminate injection.

23 Claims, 7 Drawing Figures

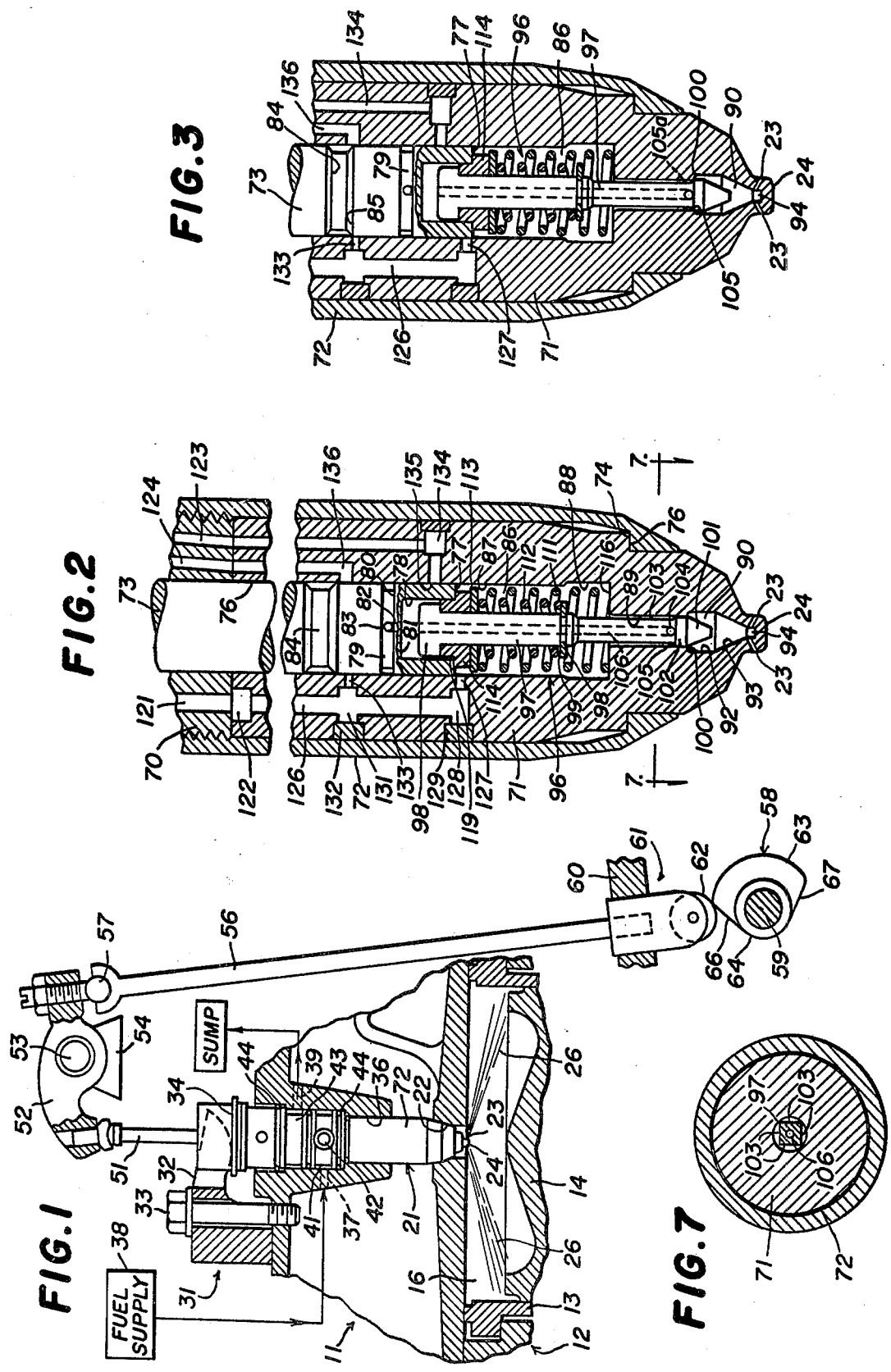

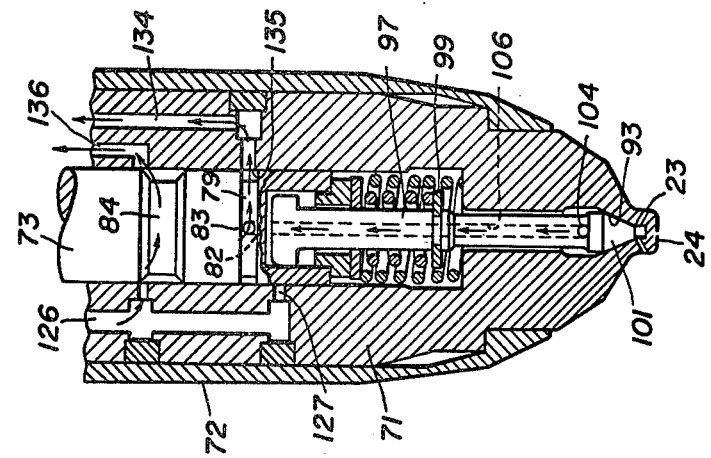
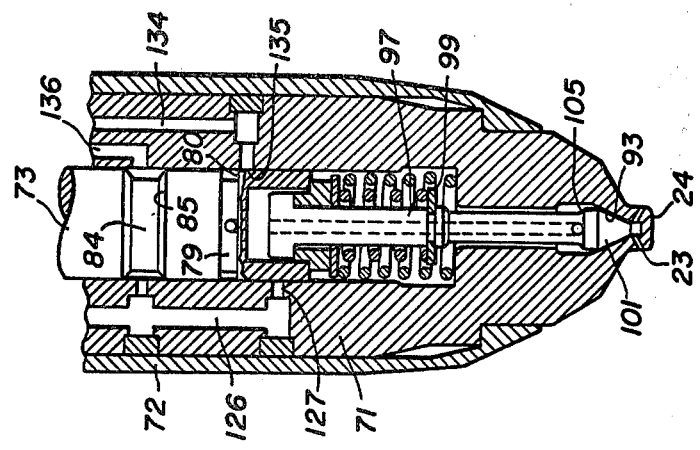
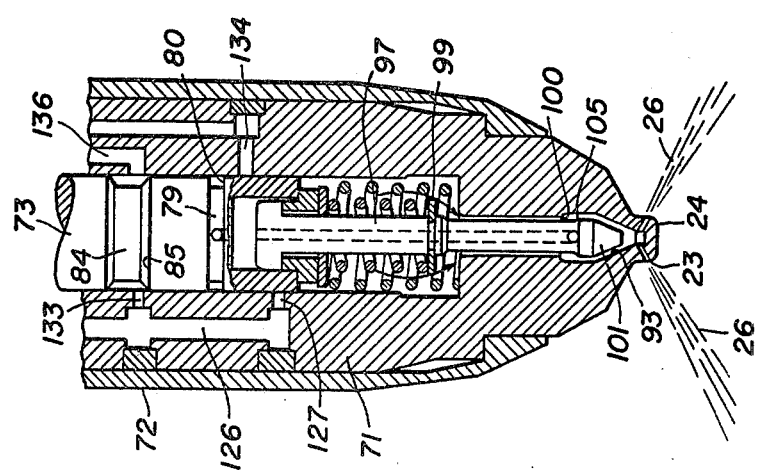

FUEL INJECTOR

One way in which fuel injectors for internal combustion engines may be classified has to do with whether they are of the closed nozzle type or of the open nozzle type. In the closed nozzle type, a valve closes the fuel passage leading to the spray holes and prevents cylinder air from entering the interior of the injector. In the open nozzle type such a valve is not provided and cylinder air is able to enter the injector. As is well known to those skilled in this art, there are certain advantages inherent in a closed nozzle type of injector.

U.S. Pat. No. 3,831,846 to J. P. Perr et al, issued Aug. 27, 1974, discloses a fuel injector which may be classed as a semi-open or open nozzle type of injector. A tip valve of the injector closes the passage leading to the spray holes during part of the injector cycle and opens the passage during another part of the cycle. While the injector disclosed in the patent has excellent operating characteristics which are described in the patent, it has been found that the amount of cylinder air entering the injector during some operating conditions is objectionable.

It is therefore an object of the present invention to provide an improved injector design which has the advantages of the injector disclosed in U.S. Pat. No. 3,831,846 and which prevents combustion air from mixing with fuel in a fuel metering chamber of the injector.

A fuel injector in accordance with the present invention is designed for use in an internal combustion engine, and comprises an injector body having a plunger bore formed therein, and a plunger reciprocably mounted in said bore and movable alternately in an injection stroke and in a retraction stroke. The body further has a metering chamber and spray holes formed therein, the plunger being movable in the metering chamber during an injection stroke and forcing fuel from said metering chamber and out of said spray holes. A tip valve is movably mounted in the metering chamber and has a first position where it seals the chamber to prevent air from entering the metering chamber, and a second position where it closes the spray holes to terminate injection. The tip valve is movable by the plunger during an injection stroke from the first position to the second position, and the tip valve permits flow from the chamber to the spray holes when intermediate the first and second positions.

The foregoing and other objects and advantages of the present invention will become apparent from the following detailed description taken in conjunction with the accompanying figures of the drawings, wherein:

FIG. 1 is a sectional view of part of an internal combustion engine including a fuel injector embodying the invention;

FIG. 2 is an enlarged sectional view of a portion of the injector shown in FIG. 1;

FIGS. 3 through 6 are views similar to FIG. 2 but showing different positions of some of the injector parts; and FIG. 7 is a sectional view taken on the line 7—7 of FIG. 2.

With reference first to FIG. 1, the internal combustion engine includes a cylinder head 11 and a block 12. A liner 13 is mounted in the block 12 and forms a cylinder for a piston 14. The space within the cylinder liner 13 between the head 11 and the crown of the piston 14 forms a combustion chamber 16. Since the construction of the head 11, the block 12 and the piston 14 may be generally conventional, they will not be described in further detail.

A fuel injector 21 embodying the invention is mounted in the head 11 with the lower end 24 thereof positioned in a hole 22 formed in the head 11. The lower end 24 of the injector 21 is located above the center of the piston 14, and fuel is injected into the combustion chamber 16 through spray holes 23 formed in the lower end 24. The reference numeral 26 indicates sprays or jets of fuel leaving the injector 21 under high pressure during operation of the injector 21. Injection of course takes place as the piston 14 approaches top dead center at the end of each compression stroke.

The injector 21 is also positioned in an upper hole 36 formed in the head 11, and it is held in place in the openings 22 and 36 by a yoke-shaped clamp 31 which has two fingers 32 formed thereon. The clamp 31 is secured to the head 11 by a screw 33. The two fingers 32 of the clamp 31 press downwardly on a flange 34 of the injector 21 and hold the injector firmly in place. The head 11 has passages formed therein for conducting fuel to and from the injector 21. The reference numeral 37 indicates a fuel supply rail or passage formed in the head 11, which receives fuel from a fuel supply 38. The reference numeral 39 indicates a fuel return rail or passage which leads from the injector 21 to a fuel supply tank or a sump. Both the fuel supply rail 37 and the return rail 39 open into the hole 36 which recives the injector 21, and the injector 21 has passages which communicate with the supply rail 37 and with the return rail 39. Fuel from the supply rail 37 flows into a channel or groove 41 in the outer periphery of the injector and into an intake passage 42 formed in the injector. Return fuel from the injector 21 flows out of the injector into an annular groove or channel 43 in the outer periphery of the injector, the channel 43 communicating with the return rail 39. Seals 44 are provided on opposite sides of the channels 41 and 43 in order to seal them. During operation of the engine, fuel flows from the supply 38, through the supply rail 37 and the channel 41, and into the injector 21, a portion of the fuel being injected into the combustion chamber 16. The remainder of the fuel flows out of the injector 21, through the channel 43, and through the return rail 39 to the fuel supply tank.

As will be described hereinafter, the injector 21 includes a plunger which is movable in injection and return strokes. The plunger is driven in the injection strokes by a cam-link mechanism including a link 51 which is attached to the upper end of the plunger of the injector 21. The upper end of the link 51 is engaged by a rocker arm 52 which is pivotally mounted on a pin 53. The rocker arm 52 is supported by a bracket 54 and the pin 53 on the head 11 of the engine. A push rod 56 engages the spherical end 57 of an adjusting screw that is attached to the rocker arm 52, the pin 53 being between the connections of the rocker arm with the link 51 and the push rod 56. The push rod 56 in turn is driven by a cam 58 which is mounted on a cam shaft 59 of the engine. A cam follower 61 including a follower roller 62 is positioned between the push rod 56 and the cam 58, the follower 61 having a sliding fit in a part 60 of the engine. Alternatively, an oscillating cam follower or other types of followers could be used. The cam 58 includes a lobe 63, a base 64, and two ramps 66 and 67 which are sloped and connect the base 64 with the lobe 63. During operation of the engine, the cam shaft 59 is turned in timed relation with the crank shaft of the engine, the cam shaft 59 turning in the counterclockwise direction as seen in FIG. 1.

The injector 21 includes a retraction or return spring (not shown) which urges the injector plunger and the link 51 upwardly and the push rod 56 downwardly. Thus, the retraction spring holds the cam follower roller 62 on the cam 58. As the cam 58 turns in the counterclockwise direction, the follower roller 62 moves up the ramp 66, and the injector plunger is driven in an injection stroke. After the cam shaft 59 has turned approximately one-half revolution, the follower roller 62 moves down the other ramp 67 and the retraction spring moves the injector plunger in a retraction or return stroke. During the time that the follower roller 62 engages the lobe 63, the injector plunger is held in a downwardly displaced position and the spray holes 23 are closed by a valve member which will be described in detail hereinafter. When the follower roller 62 engages the base 64 of the cam 58, the plunger is retracted or in an upwardly displaced position and fuel from the supply 38 is metered into a metering chamber of the injector 21.

With reference to FIG. 2, the injector 21 includes a nozzle 71, a retainer 72 and a plunger 73. The retainer 72 is positioned around the outer periphery of the nozzle 71 and connects the nozzle 71 with an adapter 70. As described in the previously mentioned Perr et al U.S. Pat. No. 3,831,846, the upper end of the retainer 72 threadedly engages the adapter 70, and the lower end of the retainer 71 includes a ledge 74 that engages a surface 76 of the nozzle 71 so that, when the retainer 72 is threaded tightly onto the adapter 70, the nozzle 71 is tightly held in assembly with the adapter 70.

The nozzle 71 has a plunger bore 76 formed therein which receives the plunger 73 in a relatively close sliding fit, the upper end of the plunger 73 being connected to the previously described link 51 (FIG. 1). The lower end 77 of the plunger 73 has a circular cavity 78 formed therein as by machining upwardly into the lower end 77. Further, the plunger 73 has an annular spill groove 79 formed therein above the bottom surface 81 of the cavity 78. An axial hole 82 is formed in the plunger 73 from the bottom 81 upwardly to the level of the spill groove 79, and a radially extending cross hole 83 is formed through the plunger 73 at the level of the spill groove 79, the hole 83 connecting the axial hole 82 with the spill groove 79. Above the spill groove 79 is formed an annular flow-through groove 84 which has a greater axial dimension than the spill groove 79.

The axially extending opening in the nozzle 71, which forms the plunger bore 76, extends downwardly below the lower end of the plunger 73 and also forms a metering chamber indicated by the reference numeral 86. The metering chamber 86 includes an upper portion 87 which has the same diameter as the plunger bore 76, a portion 88 which is enlarged slightly relative to the upper portion 87, a cylindrical passage portion 89 which has a substantially smaller diameter than the portions 87 and 88, and a bottom chamber or lower portion 90.

The lower portion 90 includes a cylindrical area 92 which has a diameter slightly larger than that of the passage portion 89, and a valve cone area 93 which forms a valve seat. A sac 94 is formed in the lower end 24 of the injector and connects with the lower portion 90. The spray holes 23 are formed through the lower end 24 and connect with the sac 94.

A tip valve assembly 96 is mounted in the metering chamber 86 below the plunger 73. The tip valve assembly 96 includes a tip valve 97 which is an elongated generally cylindrical member. The upper end of the tip valve 97 has an enlarged round head 98 formed thereon which is received within the cavity 78 formed in the lower end 77 of the plunger 73. Approximately midway along the length of the tip valve 97 is formed an annular snap ring groove 98 which receives a snap ring 99. The lower end of the tip valve 97 includes a valve cone 101 which is shaped to mate with the cone area 93. Immediately above the valve cone 101 is a cylindrical land portion 102 of the tip valve 97, which has a close sliding fit with the wall of the passage portion 89 of the metering chamber 86. Between the cylindrical portion 102 and the snap ring groove 98, the tip valve 97 is square in cross section and thus has four flat sides 103, best seen in FIG. 7. Adjacent the lower end of the flat sides 103 is formed a radially extending cross hole 104 which extends through the tip valve 96, and axially extending hole 106 is formed in the tip valve 97 from the cross hole 103 upwardly to the upper end of the tip valve. Thus, communication is provided by the holes 104 and 106 between the lower ends of the flat sides 103 and the upper end of the tip valve. At the lower ends of the flat sides 103 is formed a control edge 105 on the tip valve 97, which cooperates with a control edge 100 at the lower end of the passage portion 89, as will be described hereinafter.

The tip valve assembly 96 further includes an outer compression spring 111, an inner compression spring 112, a washer 113 and an impact member 114. The impact member 114 is positioned between the head 98 of the tip valve and the washer 113, and the outer compression spring 111 is mounted between the washer 113 and a ledge 116 of the nozzle 71, which forms the bottom surface of the enlarged portion 88 of the metering chamber 86. The inner spring 112 is mounted between the snap ring 99 and the washer 113. As shown in FIG. 2, the inner spring 112 has a smaller diameter than the outer spring 111 and it is located concentrically within the outer spring 111. The impact member 114 is annular in shape and fits around the shank of the tip valve 97 below the head 98 as previously mentioned. The upper surface of the impact member 114 normally engages the underside of the head 98, and the outer periphery of the impact member 114 is stepped as indicated at 119. The lower portion of the impact member 114 has a diameter large enough that it extends under and engages the lower end 77 of the plunger 73, and the upper portion of the impact member 114 has a reduced diameter which extends into the cavity 78.

The nozzle 71 further has a number of fuel flow passages formed therein, which include a fuel supply passage 126. The upper end of the fuel supply passage 126 communicates with a supply passage 121 formed in the previously mentioned adapter 70 and receives fuel from the fuel supply groove 41 and the passage 42. The supply passage formed in the adapter 70 may be the same as the passage 165 shown in FIG. 2 of the Perr et al U.S. Pat. No. 3,831,846, and the upper end of the passage 126 connects with the adapter supply passage 121. A one-way check valve indicated generally at 122 is preferably provided in the supply passage 126. The passage 126 is connected with the metering chamber 86 by a metering orifice 127 between the lower end of the passage 126 and the metering chamber. The orifice 127 is formed, for example, by drilling holes radially inwardly through the nozzle 71 and thus forming a passage 128 and the orifice 127, and then sealing the outer end of the hole 128 with a plug 129. The passage 126 is also connected with the plunger bore 76 by a flow-through passage 131 and orifice 133 which again may be formed by drilling radially inwardly from the outside of the nozzle 71 and then sealing the outer end of the drilled passage 131 with a plug 132. The orifice 133 connects the passage 131 with the plunger bore 76, the orifice 133 having a restricted size in order to maintain pressure in the fuel supply line 126.

The nozzle 71 further has two fuel return passages formed therein, including a spill passage 134 and a flow-through passage 136. The spill passage 134 opens into the plunger bore 76 at the point 135 which is located slightly above the level of the metering orifice 127. The flow-through passage 136 opens into the plunger bore 76 at approximately the same level as the flow-through orifice 133.

The passages 134 and 136 connect with passages 123 and 124 in the adapter, which latter passages may be the same as the passages 176 and 177 shown in FIG. 2 of the Perr et al U.S. Pat. No. 3,831,846. The return passages communicate with the groove 43 of the present injector.

With reference to FIGS. 2 through 6, FIG. 2 shows the positions of the injector parts during metering of fuel into the metering chamber 86, FIG. 3 shows the positions at the beginning of injection of fuel into the combustion chamber 16, FIG. 4 shows the positions during injection of fuel, FIG. 5 shows the positions at the termination of injection, and FIG. 6 shows the positions after termination and during flow-through of fuel.

First, with reference to FIG. 2, during the time that fuel is being metered into the metering chamber 86, the position of the cam 58 (FIG. 1) is such that the follower roller 62 engages the base 64. The follower roller 62 is at its lowermost position and the previously mentioned retraction spring has moved the link 51 and the plunger 73 to its uppermost or retracted position shown in FIG. 2. The arrangement of the retraction spring and its mounting in the adapter and its connection with the plunger may be same as is shown in FIG. 2 of the previously mentioned Perr et al U.S. Pat. No. 3,831,846. The metering orifice 127 is located so that when the plunger 73 is in its retracted position, shown in FIG. 2, the lower end 77 of the plunger 73 is above the metering orifice 127. Consequently, the orifice 127 is open and fuel is free to flow through the fuel supply passage 126, through the orifice 127 and into the metering chamber 86. The previously mentioned check valve 122 of course is arranged to permit flow in this direction. The spill-passage 134 is at a location where the portion of the plunger which is between the end 77 and the spill groove 79, closes the spill passage 134. Further, the flow-through orifice 133 and the passage 136 are located such that they are closed by the portion of the plunger 73 between the grooves 79 and 84. Consequently, fuel flows through the passage 126 and the orifice 127 but does not flow through the orifice 133 and the passages 134 and 136.

Fuel flowing out of the metering orifice 127 enters the upper portion 87 of the metering chamber 86 and it partially or completely fills the metering chamber 86. As described in the previously mentioned Perr et al patent, the amount of fuel metered into the chamber 86 depends upon the pressure of the fuel in the fuel supply passage 37 and upon the length of time that the metering orifice 127 is opened. The orifice 127 is open only during the time that the plunger 73 is in its retracted position and of course this length of time is a function of the engine speed. The fuel flows into the enlarged portion 88 and into the spaces between the flat sides 103 and the wall of the passage portion 89. The fuel flows into the holes 104 and 106 and if sufficient fuel is metered into the chamber 86, it may fill the cavity 78 at the lower end of the plunger 73.

However, the fuel metered into the chamber 86 is not able to flow into the lower portion 90 because the cylindrical portion 102, having a close sliding fit with the wall of the passage portion 89, serves to seal the lower end of the passage portion 89. This seal performs two functions. First of all, it prevents fuel in the metering chamber 86 from flowing through the spray holes 23 and dribbling into the combustion chamber 16 prior to the start of normal injection. Secondly, it prevents air from the combustion chamber from flowing through the spray holes 23 and the lower portion 90 and mixing with the fuel in the metering chamber. The advantage of this will be discussed hereinafter.

During the metering portion of the injector cycle the outer spring 111 applies an upwardly directed force on the washer 113 and the impact member 114 is held against the lower end 77 of the plunger 73. The outer diameter of the lower part of the impact member 114 is small enough that it provides clearance for flow of fuel from the metering orifice 127 into the metering chamber 86. The springs 111 and 112 hold the tip valve 97 in the upwardly displaced position shown in FIG. 2, and the length of the tip valve 97 is such that the cylindrical portion 102 is at the lower end of the passage 89. This may be referred to as the sealing position of the tip valve 97.

The injection portion of the injector cycle starts as the cam 58 turns and the ramp 66 moves under the follower roller 62. When this occurs, the push rod 56 is driven upwardly and the plunger 73 is driven downwardly in an injection stroke. As the plunger 73 moves downwardly, it of course moves the impact member 114 downwardly and, due to the inner spring 112, the tip valve 97 is also moved downwardly. As the plunger 73 moves downwardly, it closes the metering orifice 127. The distance from the lower end 77 of the plunger to the control edge 105 of the tip valve, and the distance from the lower edge of the metering orifice 127 to the control edge 100 of the nozzle are such that the control edge 105 moves past or clears the control edge 100 at the same time or slightly after the time that the lower end 77 completely closes the metering orifice 127. The plunger 73 displaces fuel out of the upper portion 87 of the metering chamber 86 and into the lower portion 90 as soon as the control edge 105 passes the control edges 100. The fuel trapped in the metering chamber 86 is forced through the lower portion 90 and out of the spray holes 23 under extremely high pressure. This portion of the cycle is illustrated in FIG. 4 which shows the path of fuel from the upper chamber portion 87, through the passage portion 89 in the spaces formed by the flat sides 103, through the lower portion 90, and out of the spray holes 23. This may be referred to as an intermediate position of the tip valve 97. During this portion of the cycle, as shown in FIG. 3 and FIG. 4, the location of the plunger flow-through groove 84 relative to the orifice 133 and the passage 136 is such that they are opened by the lower or control edge 85 of the flow-through groove 84 at approximately the same time that the lower end 77 of the plunger 73 closes the metering orifice 127. Consequently, during injection of fuel, fuel flows from the supply passage 126, through the flow-through orifice 133, the groove 84, the flow-through passage 136 and out of the injector through the passage 39 to the sump or reservoir. It will also be noted from FIGS. 3 and 4 that the spill passage 134 is closed at this time.

Continued downward movement of the plunger 73 and the tip valve 97 occurs, with the plunger 73 in engagement with the impact member 114, until the valve cone portion 101 of the tip valve 97 approaches the nozzle cone area 93. As described in detail in the previously mentioned Perr et al U.S. Pat. No. 3,831,846, when the fuel flow area between the cone portion 101 and the cone area 93 becomes less than the flow area through the spray holes 23, a hydraulic force developes on the tip valve 97 which moves the tip valve 97 very rapidly into the position shown in FIG. 5 where the cone portion 101 tightly engages the cone area 93 and thus closes the spray holes 23. This hydraulic force developes because the restricted flow area between the cone portion 101 and the cone area 93 throttles the fuel flow and causes a pressure drop through this flow area, with a corresponding higher pressure on the upper area of the tip valve 97 than on its lower end. This hydraulic force is sufficient to move the tip valve 97 rapidly downwardly in a snap action into engagement with the cone area 93. The impact member 114 is pulled by the tip valve downwardly out of engagement with the lower end 97 of the plunger 73 at this time because the tip valve moves more rapidly than the plunger.

As soon as the cone portion 101 seats on the cone area 93, the spray holes 23 are closed and injection is abruptly terminated. This position of the parts is illustrated in FIG. 2 of the previously mentioned Perr patent. The spill groove 79 and the opening 135 of the spill passage 134 are such that injection terminates at the same time as or slightly before the time that the lower or control edge 80 of the spill groove 79 opens the spill passage 134. As soon as the spray holes 23 close, pressure builds up in the metering chamber 86 and applies a high downwardly directed force on the tip valve 97, such force holding the tip valve seated on the cone area 93 and thereby preventing the tip valve 97 from bouncing off of the cone area 93. Further, this high pressure build-up serves to stop the downward movement of the plunger 73 without a mechanical impact between parts of the injector.

As the control edge 80 opens the spill passage 134, the release of pressure in the metering chamber 86 is gradual because of the gradual opening as the plunger 73 moves from the position shown in FIG. 5 to the position shown in FIG. 6. From FIG. 6 it will be noted that pressure is released in the metering chamber 86 by the flow of fuel from the metering chamber 86, through the holes 104 and 106 formed in the tip valve 97, into the cavity 78 of the plunger 73, through the holes 82 and 83 of the plunger, and through the spill groove 79. As previously mentioned, the impact member 114 moves downwardly out of engagement with the lower end 77 of the plunger 73 as the tip valve 97 engages the cone area 93. As the plunger 73 continues its downward movement it again engages the impact member 114 as shown in FIG. 5 and further downward movement of the plunger 73 at the end of the injection stroke causes the impact member 114 to be moved downwardly by the plunger 73 as shown in FIG. 6. The inner and outer springs 112 and 111 are further compressed during this period of overtravel of the plunger 73, and the increased compression of the inner spring 112 applies a high force on the tip valve 97 which holds the tip valve in seated engagement on the cone area 93 and thus prevents dribbling or secondary injection of fuel into the combustion chamber 16. The position of the tip valve shown in FIGS. 5 and 6 may be referred to as its injection termination position.

During the time that the cam lobe 63 is in engagement with the follower roller 62, the plunger 73 and the tip valve 97 are held in the positions illustrated in FIG. 6. Fuel continues to flow from the orifice 133, through the flow-through groove 84 and out of the injector through the passage 136. The fuel which flows out of the metering chamber 86 through the tip valve and the spill groove 79 flows through the spill passage 134 and to the sump. The overtravel of the plunger 73, by forcing fuel out of the metering chamber 86 along the path illustrated in FIG. 6, serves to remove or flush any impurities and air out of the metering chamber 86. Further, the fuel flow through the spill groove 84 and through the spill passage 134 during this portion of the injection or injector cycle also serves to cool the injector parts.

The injector parts are held in the position illustrated in FIG. 6 until the ramp 67 moves underneath the follower roller 62 and the roller 62 moves downwardly to the base 64 of the cam 58. When this occurs, the previously mentioned retraction or return spring moves the plunger 73 upwardly once again in its retraction or return stroke, until the base 64 of the cam 58 moves under the roller 62 at which time the injector parts are in the position shown in FIG. 2. The outer spring 111 of the tip valve assembly 96 of course holds the impact member 114 in engagement with the lower end 77 of the plunger 73 and moves the tip valve 97 upwardly. The injector then is at the beginning of another metering portion of the cycle.

As previously mentioned, the dimensions of the injector parts may be such that the control edges 105 and 100 clear each other after the time that the end 77 of the plunger 73 closes the metering orifice 127. When this occurs, a precompression on the fuel in the metering chamber 86 takes place, and the amount of this precompression is determined by the strength of the outer spring 111. This is because the compressed fuel in the upper portion 87 of the metering chamber applies a downwardly directed force on the control edge 105 of the tip valve 97. When this downwardly directed hydraulic force overcomes the strength of the outer spring 111, the hydraulic force moves the tip valve 97 downwardly slightly and causes the control edges 105 and 100 to clear. Fuel then flows out of the passage portion 89 and injection is initiated.

One way in which the operation described in the preceeding paragraph may be attained is simply to locate the control edge 105 of the tip valve 97 slightly higher than previously described. The dotted lines indicated by the numeral 105a in FIG. 3 illustrates this change. The cylindrical portion 102 would then have a slightly greater axial length. When using this modified construction, the metering orifice 127 would be closed by the end 77 slightly before the edge 105a clears the edge 100. The pressure of the fuel trapped in the upper part of the metering chamber would exert a downward force on the tip valve 97 which would move the tip valve downwardly as soon as the force of the outer spring 111 is overcome. The tip valve 97 and the impact member 114 would be moved by this force downwardly ahead of the plunger 73. The fuel in the upper portion of the metering chamber would be under precompression when the edge 105a clears the edge 100, and the amount of the precompression would be determined by the strength of the spring 111.

It will be apparent that a novel and useful injector has been provided. The injector illustrated in the drawings and described herein has the advantages of the injector disclosed in the previously mentioned Perr et al U.S. Pat. No. 3,831,846. Further, even though the injector disclosed herein may be classed as an open or semi-open nozzle type, it includes means for separating the metered fuel from the cylinder air. Consequently, even though the injector timing may be set for late injection and even at low speed and light load conditions, the cylinder air cannot mix with the fuel being metered. If such mixing were to take place, the injector would contain a highly diluted air-fuel mixture which has a low bulk modulus. Consequently the injection pressure would be low and an early, low intensity preinjection might take place. Such operation cannot occur with the present injector.

Separation of the cylinder air from the metered fuel is also advantageous in that it prevents undesired chemical reactions from taking place, such as carbon. Further, the separation prevents early fuel seepage or preinjection into the cylinder, which can produce engine smoke.

Still further, it is possible to obtain precompression of the fuel at the start of injection, and the amount of precompression may be controlled by varying the force of the outer spring 111. The amount of such precompression may be varied from zero up to approximately 4000 psi, for example.

We claim:

1. A fuel injector for use in an internal combustion engine, comprising an injector part having a plunger bore formed therein, a plunger reciprocably mounted in said bore and movable alternately in an injection stroke and in a retraction stroke, said part further having a metering chamber and spray holes formed therein, said spray holes being adapted to connect said metering chamber with a combustion chamber of said engine, the plunger being movable in the metering chamber during an injection stroke and forcing fuel from said metering chamber out of said spray holes, and into the combustion chamber, a tip valve movably mounted in said metering chamber and having a first position where it seals said metering chamber to prevent air from entering the metering chamber and having a second position where it closes the spray holes to terminate injection, said tip valve being movable by the plunger during an injection stroke from the first position to the second position, and said tip valve permitting flow from the metering chamber to said spray holes when intermediate said first and second positions.

2. A fuel injector according to claim 1, wherein said tip valve includes a valve portion and a seal portion which are spaced apart in the direction of movement of said tip valve, and said injector part includes a valve portion and a seal portion which are spaced apart in said direction of movement, said valve portions engaging when said tip valve is in said second position and said seal portions engaging when said tip valve is in said first position.

3. A fuel injector according to claim 2, wherein said injector part has a fuel supply passage formed therein, said plunger closing said supply passage during said injection stroke, and said seal portions moving out of engagement at approximately the same time that said plunger closes said supply passage.

4. A fuel injector according to claim 2, wherein said injector part has a fuel supply passage formed therein, said plunger closing said supply passage during said injection stroke, and said seal portions moving out of engagement slightly after the time that said plunger closes said supply passage.

5. A fuel injector for an internal combustion engine, comprising an injector body part, having a fuel metering chamber formed therein which is adapted to receive fuel from a fuel supply, a plunger movable into said chamber in an injection stroke to force fuel from the chamber and out of said body part through spray holes, a valve member mounted in the path of fuel flow from said chamber to said spray holes, said valve member being movable between first and second positions, said valve member when in said first position sealing said path and preventing air from passing through said spray holes and entering said metering chamber, and said valve member when in the second position closing said spray holes to terminate injection, said plunger during an injection stroke moving the valve member from said first position toward the second position, fuel injection taking place while said valve member is intermediate the first and second positions, and said valve member being subjected to hydraulic forces at the end of said injection stroke which move said valve member into the second position in order to abruptly terminate injection.

6. A fuel injector for use in an internal combustion engine, comprising an injector body part having a fuel metering chamber and spray holes formed therein, a plunger reciprocably mounted in said body part and movable into said metering chamber during an injector stroke, a tip valve assembly mounted in said metering chamber and including a tip valve, said tip valve and said injector part having mating sealing surfaces and mating valve surfaces formed thereon, said assembly including spring means between said body part and said tip valve for urging said tip valve to a first position where said valve surfaces are separated and said sealing surfaces are engaged, said tip valve assembly being engaged by said plunger during an injection stroke to move said tip valve from said first position to a second position where said valve surfaces are engaged.

7. A fuel injector for an internal combustion engine, comprising an injector body part, a metering chamber and spray holes formed in said body part, a plunger movable in said metering chamber alternately in an injection stroke and in a retraction stroke, said plunger when moving in an injection stroke displacing fuel from said metering chamber and out of said spray holes, a tip valve movably mounted in said body part in the path of fuel flow from said chamber to said spray holes, first and second seal surfaces formed on said body part adjacent said tip member, said tip valve being movable to a first position where it engages said first seal surface and movable to a second position where it engages said second seal surface, said tip member sealing said path against fuel flow in both of said positions.

8. An injector according to claim 7, and further including spring means for urging said tip member to said first position, said plunger when in said injection stroke moving said tip member toward said second position.

9. An injector according to claim 8, wherein the flow area between said tip valve and said seal surface becomes less than the flow area through said spray holes as said tip valve closely approaches said second position, resulting in a hydraulic force which moves said tip member abruptly to said second position.

10. An injector according to claim 7, wherein said injector body further includes an orifice which is adapted to receive fuel from a fuel supply and meter said fuel into said metering chamber, said plunger closing said orifice during said injection stroke, and said plunger moving said tip valve out of engagement with said first seal surface at substantially the same time that said plunger closes said orifice.

11. An injector according to claim 10, wherein said plunger closes said orifice before said tip valve disengages said first seal surface.

12. Fuel injector apparatus, comprising an elongated tip valve, said tip valve including a valve seat portion formed at one end thereof, a fuel flow passage on said tip valve and extending longitudinally thereof, and means on said tip valve between said fuel flow passage and said valve seat portion for blocking the flow of fuel along said passage, a spring assembly attached to the other end of said tip valve, said spring assembly including an impact member movably attached to the other end of said tip valve, a first spring connected between said impact member and said tip valve, and a second spring having one end thereof connected to said impact button, an injector body part forming a metering chamber and spray holes, said tip valve being movably mounted in said body part in the path of fuel flow from said metering chamber to said spray holes, a first seal surface formed on said body part adjacent said valve seat portion, a second seal surface formed on said body part adjacent said means, said tip valve being movable to a first position where said valve seat portion engages said first seal surface and to a second position where said means engages said second seal surface, said tip valve preventing the flow of fuel from said metering chamber to said spray holes when in both of said positions, and further including a bore formed in said body part, a plunger reciprocably mounted in said bore, said plunger being movable in an injection stroke to engage said impact member and move said tip valve to said first position, the other end of said second spring engaging said body part and said second spring urging said tip valve toward said second position.

13. Fuel injector apparatus according to claim 12, wherein said body part has a fuel supply passage formed therein, said plunger closing said supply passage during said injection stroke, said means moving out of engagement with said second seal surface at approximately the same time that said plunger closes said supply passage.

14. Fuel injector apparatus according to claim 12, wherein said body part has a fuel supply passage formed therein, said plunger closing said supply passage during said injection stroke, said means moving out of engagement with said second seal surface slightly after the time that said plunger closes said supply passage.

15. A fuel injector for injecting fuel into a cylinder of an internal combustion engine, comprising an injector body part, a fuel receiving chamber and fuel outlet holes formed in said body part, a plunger movable in said receiving chamber alternately in an injection stroke and in a retraction stroke, said plunger when moving in said injection stroke displacing fuel from said receiving chamber and out of said outlet holes, a valve member movably mounted in said body part in the path of fuel flow from said receiving chamber to said outlet holes, first and second seal surfaces formed on said body part adjacent said valve member, said valve member being movable to a first position where it engages said first seal surface and movable to a second position where it engages said second seal surface, the injection of fuel being initiated when said valve member moves out of engagement with said first seal surface and continuing until said valve member engages said second seal surface, and said valve member sealing said path against fuel flow when in either of said positions.

16. An injector according to claim 15, and further including spring means for urging said valve member to said first position, said plunger when in said injection stroke moving said valve member toward said second position.

17. An injector according to claim 16, wherein the flow area between said valve member and said seal surface becomes less than the flow area through said outlet holes as said valve member closely approaches said second position, resulting in a hydraulic force which moves said valve member abruptly to said second position.

18. An injector according to claim 15, wherein said injector body further includes an orifice which is adapted to receive fuel from a fuel supply and meter said fuel into said fuel receiving chamber, said plunger closing said orifice during said injection stroke, and said plunger moving said valve member out of engagement with said first seal surface at substantially the same time that said plunger closes said orifice.

19. An injector according to claim 18, wherein said plunger closes said orifice before said valve member disengages said first seal surface.

20. An injector according to claim 15, wherein said valve member includes a generally cylindrical land engagable with said first seal surface when in said first position.

21. An injector according to claim 15, wherein said path is formed in the outer surface of said valve member.

22. An injector according to claim 15, and further including a spring assembly attached to said valve member, said spring assembly including an impact member movably attached to said valve member, a first spring connected between said impact member and said valve member, and a second spring having one end thereof connected to said impact button and the other end connected to said body part.

23. An injector according to claim 15, wherein said valve member further has a second fuel flow passage therein.

* * * * *